(12) United States Patent
Wipasuramonton et al.

(10) Patent No.: US 8,388,019 B2
(45) Date of Patent: Mar. 5, 2013

(54) AIRBAG MODULE

(75) Inventors: Pongdet Paul Wipasuramonton, Rochester, MI (US); Jonathan Lee Clarke, Troy, MI (US); Prabhakar Padiyar, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/923,578

(22) Filed: Sep. 28, 2010

(65) Prior Publication Data

US 2011/0074141 A1    Mar. 31, 2011

Related U.S. Application Data

(60) Provisional application No. 61/246,643, filed on Sep. 29, 2009.

(51) Int. Cl.
 *B60R 21/207* (2006.01)
 *B60R 21/2342* (2011.01)
(52) U.S. Cl. .................................. 280/730.2; 280/743.1
(58) Field of Classification Search ............... 280/730.2, 280/736, 740, 742, 743.1, 743.2, 729
See application file for complete search history.

(56) References Cited

U.S. PATENT DOCUMENTS

| | | | | |
|---|---|---|---|---|
| 5,308,113 A * | 5/1994 | Moriset | ....................... | 280/743.2 |
| 5,454,595 A * | 10/1995 | Olson et al. | ................ | 280/743.1 |
| 5,489,119 A * | 2/1996 | Prescaro et al. | ........... | 280/743.2 |
| 5,586,782 A * | 12/1996 | Zimmerman et al. | ..... | 280/730.2 |
| 5,871,231 A * | 2/1999 | Richards et al. | .............. | 280/735 |
| 5,899,495 A * | 5/1999 | Yamamoto et al. | ........ | 280/743.1 |
| 6,062,594 A * | 5/2000 | Asano et al. | ................ | 280/730.2 |
| 6,142,507 A * | 11/2000 | Okuda et al. | ................ | 280/730.2 |
| 6,355,123 B1 * | 3/2002 | Baker et al. | ...................... | 156/90 |
| 6,997,473 B2 * | 2/2006 | Tanase et al. | ............... | 280/730.2 |
| 7,093,854 B2 * | 8/2006 | Fischer et al. | ............. | 280/743.2 |
| 7,121,580 B2 * | 10/2006 | Sato et al. | ................... | 280/730.2 |
| 7,134,691 B2 * | 11/2006 | Dunkle et al. | ............. | 280/743.2 |
| 7,156,418 B2 * | 1/2007 | Sato et al. | ................... | 280/730.2 |
| 7,192,050 B2 * | 3/2007 | Sato et al. | ...................... | 280/729 |
| 7,195,281 B2 * | 3/2007 | Williams et al. | ........... | 280/743.2 |
| 7,431,329 B2 * | 10/2008 | Taguchi et al. | ............... | 280/729 |
| 7,549,672 B2 * | 6/2009 | Sato et al. | ................... | 280/730.2 |
| 7,819,419 B2 * | 10/2010 | Hayashi et al. | ............ | 280/730.1 |
| 8,047,564 B2 * | 11/2011 | Kibat et al. | ................ | 280/730.2 |
| 2002/0036402 A1 * | 3/2002 | Heigl et al. | ................ | 280/743.2 |
| 2003/0168836 A1 * | 9/2003 | Sato et al. | ................... | 280/730.2 |
| 2004/0124615 A1 * | 7/2004 | Tanase et al. | ............... | 280/730.2 |
| 2005/0225065 A1 * | 10/2005 | Fujll | .......................... | 280/743.2 |
| 2006/0131847 A1 * | 6/2006 | Sato et al. | ................... | 280/730.2 |
| 2008/0231026 A1 * | 9/2008 | Naito et al. | ................ | 280/730.2 |

* cited by examiner

*Primary Examiner* — Paul N Dickson
*Assistant Examiner* — Laura Freedman
(74) *Attorney, Agent, or Firm* — Foley & Lardner LLP (57) ABSTRACT

An airbag module comprising an inflatable airbag; and an inflator configured to provide gas to inflate the airbag; wherein the airbag comprises first and second panels positioned on opposite sides of an inflatable chamber; wherein each of the panels include a peripheral portion and an interior portion; wherein a portion of the interior portion is a covered portion; wherein a portion outside of the covered portion of the interior portions of the first and second panels are connected together to thereby limit the inflation of a portion of the inflatable chamber; and wherein the airbag is configured so that the connection between the interior portions of the first and second panels is released during inflation of the airbag in order to permit an increase in the volume of the inflatable chamber.

11 Claims, 8 Drawing Sheets

AIRBAG MODULE

CROSS-REFERENCE TO RELATED PATENT APPLICATIONS

This application claims priority to and the benefit of U.S. Provisional Patent Application No. 61/246,643, filed on Sep. 29, 2009. The foregoing provisional application is incorporated by reference herein in its entirety.

BACKGROUND

The present disclosure relates generally to the field of airbags in automotive vehicles. More specifically, this disclosure relates to an airbag configured to include at least one tear mechanism to tailor the inflation sequence of the airbag during deployment to reduce the impact force imparted by the deploying airbag to improve occupant protection.

Airbags typically are configured to provide optimal protection to an in-position occupant. In the event a vehicle occupant is out of position and the vehicle experiences a dynamic impact event (e.g., a collision with an obstacle) that triggers airbag deployment, the airbag may impart a "punch" or impact force onto the out-of-position occupant, due to it being configured to provide optimal protection to an in-position occupant. This punch force may be caused by the inertia of the airbag, which is a result of the sudden deployment of the airbag from rapid generation of inflation gas being forced into the airbag cushion.

It would be advantageous for an airbag to provide improved protection to out-of-position occupants by reducing the punch force imparted onto the out-of-position occupant caused by the inertia of the deploying airbag cushion. It would further be advantageous for an airbag while providing improved protection to an out-of-position occupant to have a fully deployed position and internal cushion pressure that provides optimal protection to an in-position occupant.

SUMMARY

One embodiment of the invention relates to an airbag module comprising an inflatable airbag; and an inflator configured to provide gas to inflate the airbag; wherein the airbag comprises first and second panels positioned on opposite sides of an inflatable chamber; wherein each of the panels include a peripheral portion and an interior portion; wherein a portion of the interior portion is a covered portion; wherein a portion outside of the covered portion of the interior portions of the first and second panels are connected together to thereby limit the inflation of a portion of the inflatable chamber; and wherein the airbag is configured so that the connection between the interior portions of the first and second panels is released during inflation of the airbag in order to permit an increase in the volume of the inflatable chamber.

The connection between the interior portions of the first and second panels may include a plurality of parallel stitched seams, which may be configured to release the interior portions of the first and second panels at different times during inflation of the airbag. The connection between the interior portions of the first and second panels may include a plurality of non-linearly stitched seams.

The connection between the interior portions of the first and second panels may be located in an upper portion of the inflatable chamber so that upon initiation of the inflator and prior to release of the connection between the interior portions of the panels inflation of the upper portion of the inflatable chamber is limited while inflation of a lower portion of the inflatable chamber is unabated. The connection between the interior portions of the first and second panels that is located in the upper portion of the inflatable chamber may extend in length to a central portion of the inflatable chamber.

The connection between the interior portions of the first and second panels may be located in a lower portion of the inflatable chamber so that upon initiation of the inflator and prior to release of the connection between the interior portions of the panels inflation of the lower portion of the inflatable chamber is limited while inflation of an upper portion of the inflatable chamber is unabated.

The connection between the interior portions of the first and second panels may be located in a central portion of the inflatable chamber so that upon initiation of the inflator and prior to release of the connection between the interior portions of the panels inflation of the central portion of the inflatable chamber is limited while inflation of an upper portion and a lower portion of the inflatable chamber is unabated.

Another embodiment of the invention relates to an airbag module comprising an inflatable airbag; and an inflator configured to provide gas to inflate the airbag; wherein the airbag comprises first and second panels positioned on opposite sides of an inflatable chamber; wherein each of the panels include a peripheral portion and an interior portion; wherein the interior portions of the first and second panels are stitched together along a seam to thereby limit the inflation of a portion of the inflatable chamber; wherein the seam does not intersect with the peripheral portion of the panels; wherein the seam is configured to tear apart during inflation of the airbag in order to allow the interior portions of the first and second panels to separate and thereby permit further inflation of the portion of the inflatable chamber.

The airbag module may include a plurality of seams configured to tear apart during inflation of the airbag in order to allow the interior portions of the first and second panels to separate and thereby permit further inflation of the portion of the inflatable chamber. The plurality of seams may be separated by an offset distance that remains constant along the lengths between any two seams. The plurality of seams may be separated by an offset distance that varies along the lengths between any two seams, and the plurality of seams may be non-linearly configured.

The seam may be configured to extend from a first end located in an upper portion of the inflatable chamber that is central to the width of the inflatable chamber, and is configured to extend to a second end located in about a mid-height portion of the inflatable chamber that is forward along the width of the inflatable chamber.

Another embodiment of the invention relates to an airbag module comprising an inflatable airbag; an inflator configured to provide gas to inflate the airbag; wherein the airbag comprises first and second panels positioned on opposite sides of an inflatable chamber; wherein each of the panels include a peripheral portion and an interior portion having a covered portion; wherein the airbag includes a tear mechanism provided outside of the covered portion connecting the interior portions of the first and second panels together to thereby limit the inflation of a portion of the inflatable chamber; wherein tear mechanism is configured to release the connection between the interior portions of the first and second panels during inflation of the airbag in order to permit further inflation of the portion of the inflatable chamber.

The tear mechanism may include a plurality of stitched seams; wherein at least one of the seams is configured to tear apart during inflation of the airbag to allow the previously connection portion of the interior portions of the first and second panels to separate.

The airbag module may further comprise at least a second tear mechanism connecting the interior portions of two panels together to thereby limit the inflation of a second portion of the inflatable chamber, wherein the second tear mechanism is configured to release the connection between the interior portions of the two panels during inflation of the airbag in order to permit further inflation of the portion of the inflatable chamber. The second tear mechanism may include a plurality of stitched seams, wherein at least one of the seams is configured to tear apart during inflation of the airbag to allow the second connection portion of the interior portions of the first and second panels to separate. The portion of the inflatable chamber connected by the first tear mechanism may be located in a different portion of the inflatable chamber than the second portion of the inflatable chamber connected by the second tear mechanism. The two panels connected by the second tear mechanism may include third and fourth panels.

DETAILED DESCRIPTION

Airbag systems (e.g., side-impact, front-impact) are located in vehicles to restrain occupants during a dynamic vehicle event (e.g., a front-impact, a side-impact, a rollover event, etc.) in order to reduce the likelihood of injury sustained by the occupant during such events. An airbag system typically includes an inflatable airbag cushion that deploys from a stored configuration, during a dynamic vehicle event, and inflates from gas which is rapidly pushed into the airbag cushion by means of an inflator or other gas generating device. An inflator or module may use a device, such as a pyrotechnic device or other airbag inflation device, to generate gas almost instantaneously and to push the gas at a high volumetric flow rate into the inflatable airbag cushion of the airbag system.

An airbag cushion or airbag may be stored within and deployed from almost anywhere in the vehicle. For example, airbag cushions are stored within and deployed from the inside or outside facing side-surfaces of the seat-back of a seat assembly. Also, for example, airbag cushions are stored within and deployed from within the dashboard or from the steering column of the vehicle. Airbags are typically packaged for storage through a process involving folding and/or rolling to compact the airbag in order for it to fit into the small storage volume (e.g., a portion of the seat back of a seat system) containing the stored airbag cushion. Airbags may be used to provide restraint to any occupant located in any seating row (e.g., first, second, third, etc.) or seat configuration (e.g., bucket seat, bench seat, etc.) of a vehicle.

Figure 1:
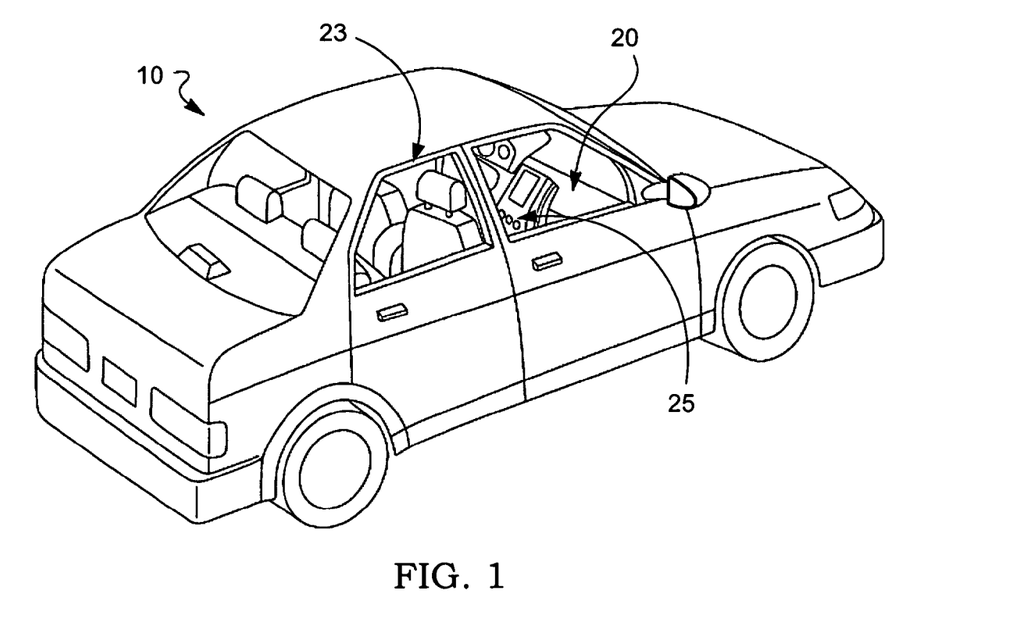
FIG. 1 is a perspective view of an exemplary embodiment of an automotive vehicle that includes an airbag system with a tear mechanism.

With reference to FIG. 1, an exemplary embodiment of an automotive vehicle 10 is illustrated, and includes an interior compartment 20. The interior compartment 20, as shown, includes a driver side 23 and a passenger side 25, where each may be configured to include at least one airbag module or system. Those skilled in the art will recognize that the airbag systems disclosed herein can be included within any passenger compartment (e.g., driver side, passenger side, rear passenger) of any vehicle, and the illustrations herein are not meant as limitations.

Figure 2:
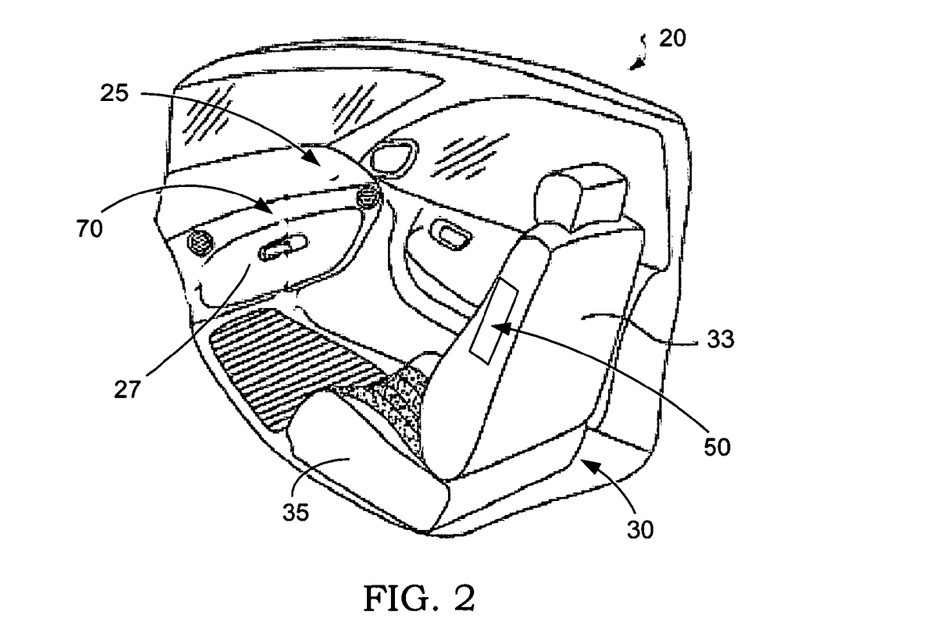
FIG. 2 is a perspective view of a passenger compartment of a vehicle, such as the vehicle of FIG. 1, illustrating a side-impact airbag system installed within the seat assembly and a front-impact airbag system installed within the dashboard.

With reference to FIG. 2, an exemplary embodiment of the passenger side 25 of an interior compartment 20 is illustrated and includes a dashboard 27 and a seat assembly or system 30 configured to provide seating to a vehicle occupant. The seat system 30 includes a seat back 33 and a seat cushion 35. The seat system 30 may further be configured to include an airbag system or module 50 to provide occupant restraint, such as restraint during a vehicle side-impact event. The dashboard 27 be configured to include an airbag system or module 70 to provide occupant restraint, such as restraint during a vehicle front-impact event.

According to an exemplary embodiment, a side-impact airbag module or system 50 is stored in and deployed from the seat back 33 of seat system 30. Airbag system 50 may be configured to deploy from the seat back 33 to provide restraint to an occupant (not shown in FIG. 2 for clarity) of vehicle 10 during dynamic impact events, such as side-impacts. According to other embodiments, the side-impact airbag system 50 may be stored in and deployed from the seat cushion 35 of the seat system, from other seat components, or from other vehicle components (e.g., roof-rail), whereby the airbag system 50 may be configured to deploy to provide occupant restraint during vehicle impacts.

According to an exemplary embodiment, a front-impact airbag module or system 70 is stored in and deployed from within the dashboard 27 of the interior compartment 20. Airbag system 70 may be configured to deploy from the dashboard 27 to provide restraint to an occupant of vehicle 10 during dynamic impact events, such as front-impacts. According to other exemplary embodiments, the front-impact airbag system 70 may be stored in and deployed from the steering column, from the glove-box, or other vehicle components, whereby the airbag system 70 may be configured to deploy to provide occupant restraint during vehicle impacts.

The airbag systems disclosed herein having tear mechanisms, seams, and/or connections may be configured to be stored in and deploy from any vehicle component and may provide restraint to any vehicle occupant. Those skilled in the art will recognize that the airbag systems disclosed herein are not meant to be limitations.

Figure 3:
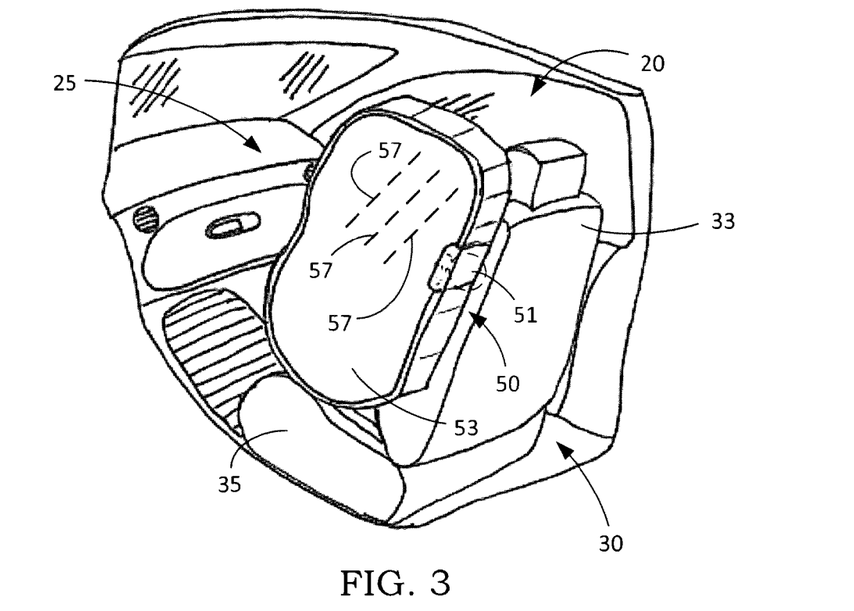
FIG. 3 is a perspective view of a passenger compartment, such as the passenger compartment of FIG. 2, illustrating an exemplary embodiment of a side-impact airbag system with the airbag cushion deployed on the inboard side of the seat assembly.
Figure 4:
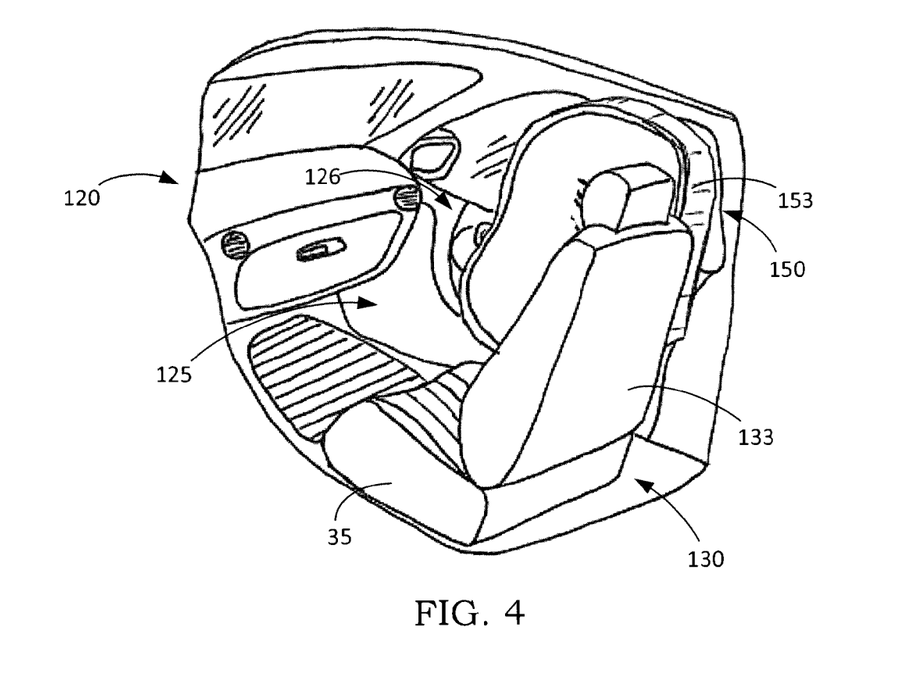
FIG. 4 is a perspective view of a passenger compartment, such as the passenger compartment of FIG. 2, illustrating another exemplary embodiment of a side-impact airbag system with the airbag cushion deployed on the outboard side of the seat assembly.

With reference to FIGS. 3 and 4, side-impact airbag systems 50, 150 are shown deployed from the side of the seat back 33, 133 of the seat systems 30, 130. The airbag systems 50, 150 may be installed into and stored within any portion of the seat backs 33, 133 of the seat systems 30, 130. The airbag systems 50, 150 may be configured to deploy from any portion of the seat backs 33, 133 of the seat systems 30, 130. The airbag systems may be tailored based on the package space within the seat back and the configuration of the interior compartment to provide optimal restraint to the occupant within these constraints.

According to the exemplary embodiment shown in FIG. 4, side-impact airbag system 150 is installed within the seat back 133 and is configured to deploy from the outside surface of the outboard side of seat back 133 to a location provided between the occupant (not shown for clarity) and the inside surfaces of the door assembly 126 of the passenger compartment 125. During deployment, the airbag system 150 may restrain the occupant (not shown) to prohibit the occupant (or a portion of the occupant, such as the head) from impacting other interior vehicle components (e.g., inside of the window, door structure, etc.).

According to the exemplary embodiment shown in FIG. 3, side-impact airbag system 50 is installed within the seat back 33 and is configured to deploy from the outside surface of the inboard side of seat back 33 to a location provided between the occupant (not shown for clarity) and the adjacent seat (e.g., driver seat) and/or adjacent occupant (e.g., driver). During deployment, the airbag system 50 may restrain the occupant (not shown) to prohibit the occupant (or a portion of the occupant) from impacting other interior vehicle components (e.g., center console, adjacent located seat assembly) or other vehicle occupants.

According to an exemplary embodiment, the side-impact airbag system 50 includes an inflatable airbag cushion 53 and an inflator 51 to provide for inflation of the airbag cushion 53 by generation of inflation gas. The airbag system may further include a housing or structure to provide for attachment of the airbag system to the seat or vehicle component, where the housing may further provide structural support for the airbag system during assembly, installation, and deployment.

Figure 5:
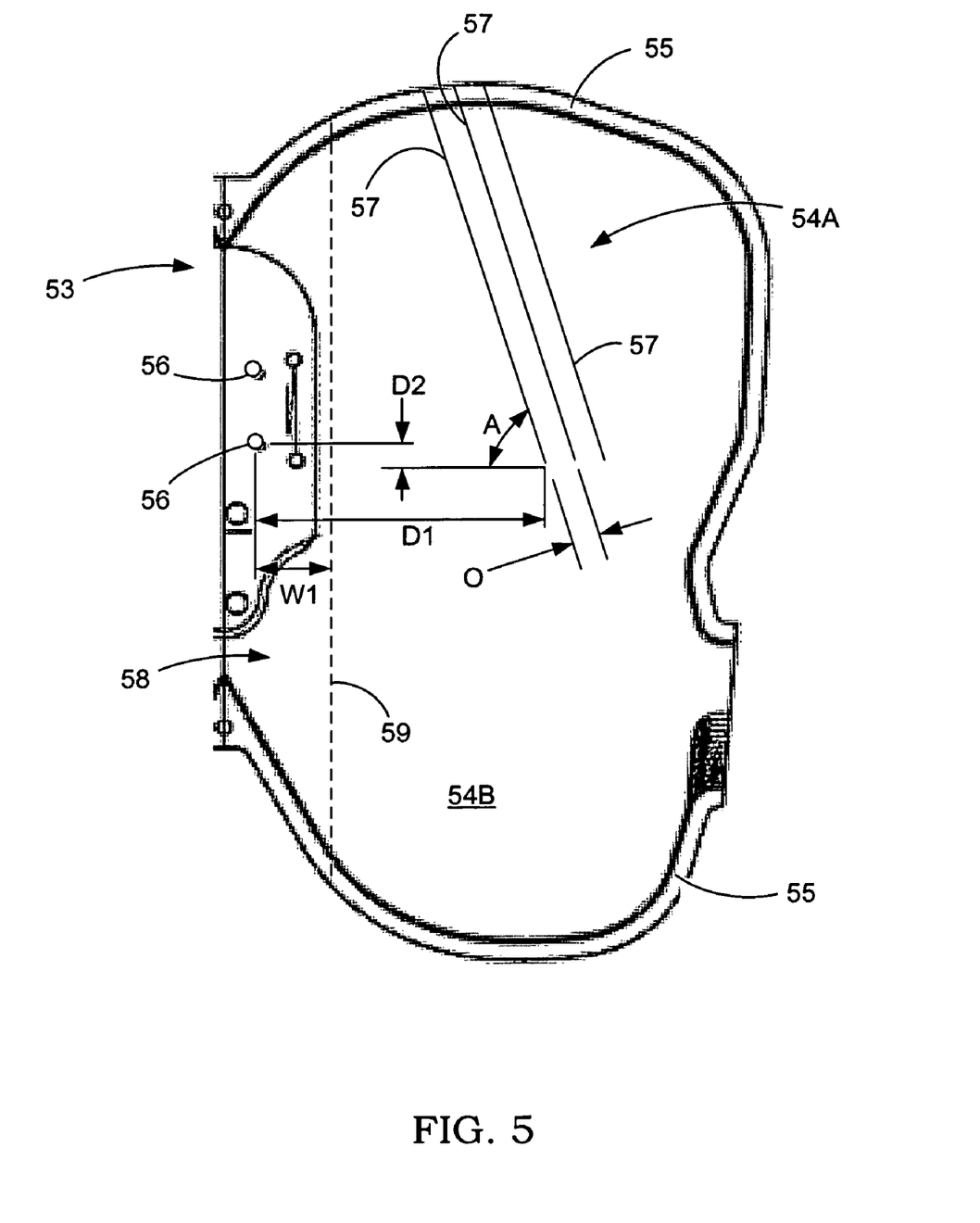
FIG. 5 is a side view of an exemplary embodiment of a side-impact airbag cushion having a tear mechanism, shown prior to folding and installation into a vehicle.
Figure 6:
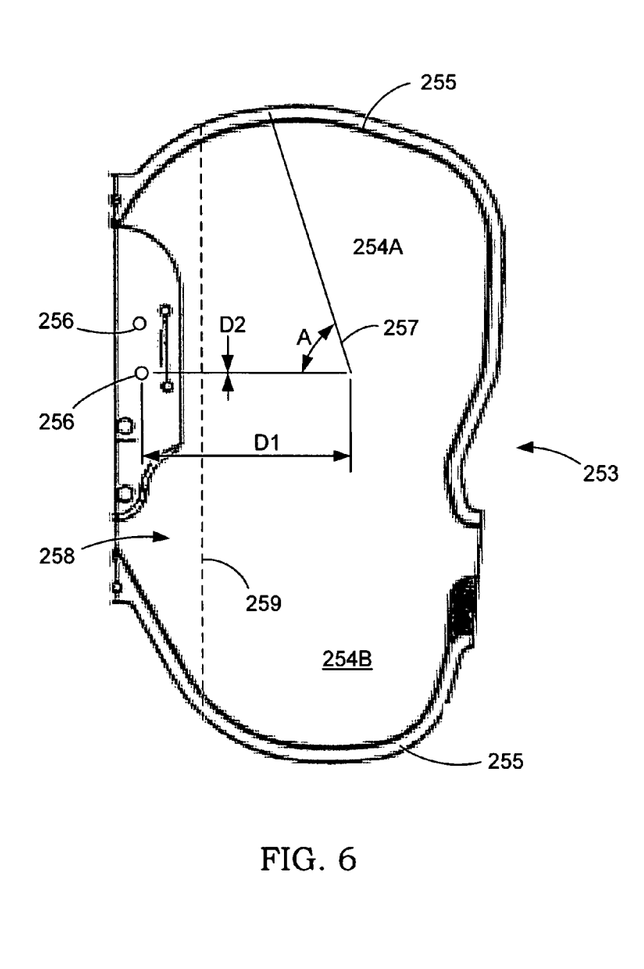
FIG. 6 is a side view of another exemplary embodiment of a side-impact airbag cushion having a tear mechanism, shown prior to folding and installation into a vehicle.
Figure 7:
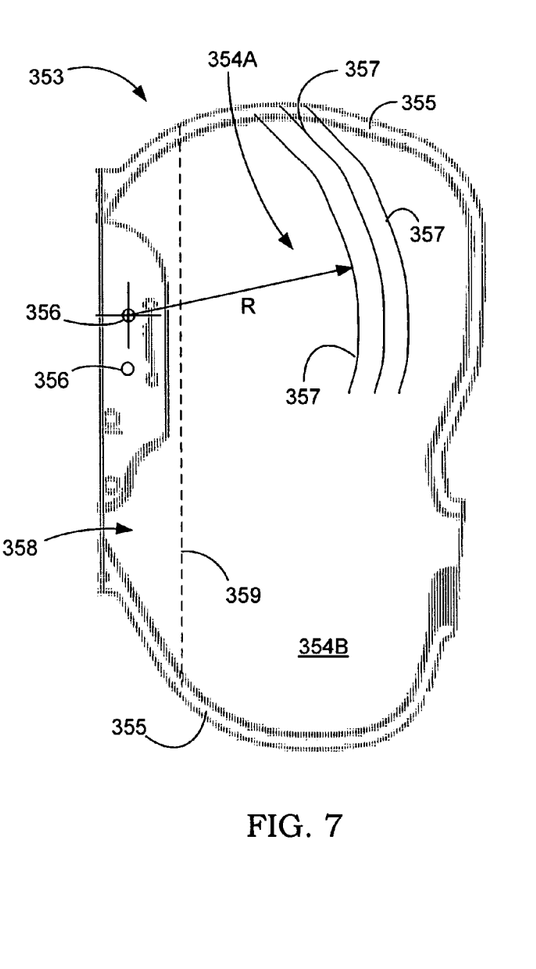
FIG. 7 is a side view of yet another exemplary embodiment of a side-impact airbag cushion having a tear mechanism, shown prior to folding and installation into a vehicle.

With reference to FIGS. 5-7, exemplary embodiments of side-impact airbag cushions 53, 253, 353 are shown prior to folding and installation into an airbag system or a vehicle. A side-impact airbag cushion may include one or more than one panel coupled together using any suitable method (e.g., stitching, adhesive), whereby each panel is made from any suitable airbag material (e.g., woven high strength nylon). The panels forming the airbag cushion may be coupled to form a seam, which may be configured to prohibit the escape of inflation gas through the seam. The profile or periphery of the seam may form at least one inflatable portion or chamber in the airbag cushion, whereby during deployment the inflatable portion is filled and expanded by inflation gas from the inflator. The seam may be configured along the outer periphery of the panels or may be located within the periphery of the panels. The seam may be tailored to the desired deployed shape of the airbag cushion.

The airbag cushion may be configured to include a plurality of inflatable chambers, such as through the use of multiple seams or additional panels. The plurality of inflatable chambers may be fluidly connected (i.e., allowing inflation gas to flow between at least two chambers) or fluidly separated (i.e., inflation gas is prohibited from flowing between two chambers) by a divider.

According to the exemplary embodiment shown in FIG. 5, the side-impact airbag cushion 53 includes a roughly D-shaped first (e.g., inner) panel coupled to a similarly shaped second (e.g., outer) panel, along at least a portion of the periphery of each panel, through the use of at least one seam 55. The seam 55 is configured to be a chain-stitch made from a thread size, such as a T-135 or T-210, which is strong enough to withstand the peel forces caused by the high internal pressure in the airbag cushion during deployment. The peripheral seam 55 encloses interior portions of the first and second panels forming an inflatable chamber having two fluidly connected portions, an upper portion (or thorax restraint portion) 54A configured to provide restraint to the torso or thorax of the occupant, and a lower portion (or pelvic restraint portion) 54B configured to provide restraint to the pelvic region of the occupant. The upper portion 54A and the lower portion 54B of cushion 53 being fluidly connected are configured to receive inflation gas from the same inflator 51 (not shown in FIG. 5, but shown in FIG. 8).

According to an exemplary embodiment, the peripheral seam 55 of airbag cushion 53 further encloses a covered or unexposed portion 58, which is formed by the first and second panels forming the inflatable chamber. According to an exemplary embodiment, the covered portion 58 remains substantially covered during airbag deployment by a portion of the seat, such as the seat cover or seat trim. According to another exemplary embodiment, the covered portion 58 remains substantially within at least a portion of the seat system and does not breach the seat system, during deployment. The covered portion 58 extends from the trailing edge of the airbag cushion (i.e., the edge of the cushion that remains substantially fixed to the seat system during deployment) during deployment to an edge 59 (which is illustrated in FIG. 5 by a dashed line). According to an exemplary embodiment, the edge 59 is located in the inflatable portion of the airbag cushion 53 and the covered portion 58 is fluidly connected to other portions (e.g., lower portion 54B, rearward portion of upper portion 54A) of the inflatable chamber. The edge 59 may be located at a distance W1 from an inflator coupling feature 56. Typically, W1 will be a distance in the range of 50-250 mm, but the distance may vary outside of this range, depending on the seat configuration.

It should be noted that a high level of energy is utilized in order to deploy an airbag almost instantaneously (e.g., from about 5-20 ms) to provide restraint to the employed, the portion of the seat (e.g., seat cover, seat trim) intended to cover the covered portion of the airbag cushion may be displaced to a position not covering the covered portion during deployment. Thus, the covered portion of the cushion may vary in size and shape from airbag module to airbag module and throughout deployment of each airbag. It should also be noted that the edge 59, although illustrated as a substantially linear feature, is configured based on the geometry of the portion of the seat (e.g., seat cover, seat trim) that overlays the covered portion 58 of the airbag cushion 53 during deployment, and thereby the edge 59 may form any suitable shape or contour that the seat portion may take. The illustrations of the geometry of the edge 59 and covered portion 58 are not meant as limitations.

According to other exemplary embodiments, the panel shape and quantity may vary, the seam location or configuration may vary, the size, quantity and location of inflatable portions of the cushion may vary. For example, the seam may be configured to be a different type of stitch using varying thread sizes, or the panels may attach or couple through other methods (e.g., adhesive). Those skilled in the art will recognize that the panels of the cushion and the seam may be tailored to meet specific customer and/or vehicle configurations, and may vary from that disclosed herein, and the embodiments disclosed and illustrated in this application are not meant as limitations, but meant as reference for the tear mechanisms discussed below.

According to an exemplary embodiment, the airbag cushion 53 includes at least one inflator coupling feature or mechanism 56, configured to couple the inflator to the cushion, so that during airbag deployment the coupling mechanism 56 remains attached to the inflator to allow inflation gas to enter the inflatable chamber of the airbag cushion. The inflator coupling mechanism 56 may include a hole or aperture, such as shown in FIG. 5, configured to receive a fastener to couple the inflator to the cushion, or may be configured according to any known or future methods for coupling the inflator to the airbag cushion.

The airbag cushion may include at least one tear mechanism, connection or seam configured to improve occupant restraint during events triggering airbag deployment. The tear mechanism, connection or seam may be configured to couple a first (e.g., inner) panel of the airbag cushion to a second (e.g., outer) panel of the airbag cushion local to the position of the tear mechanism, connection or seam. For example, the connection may couple a portion of the interior of the first panel to a portion of the interior of the second panel. The tear mechanism, connection or seam is configured to prevent or substantially prohibit the flow of inflation gas across or through the tear mechanism, connection or seam, until the tension in the tear mechanism, connection or seam that is induced by expansion of the airbag cushion during deployment, reaches a predetermined value, which causes the tear mechanism, connection or seam to tear. The tear mechanism, connection or seam, by prohibiting gas to pass until torn, may be used to tailor the inflation sequence of the airbag cushion by delaying inflation of a portion of the airbag cushion. The portion of the airbag cushion having delayed inflation has a reduced inertia, thereby lowering the impact forces imparted from the cushion to the occupant upon contact and following such contact.

According to the exemplary embodiment shown in FIG. 5, the airbag cushion 53 includes a connection that couples the interior portions of the first and second panels. The connection includes three substantially linear seams 57 provided in the inflatable chamber of the airbag cushion 53 and forward of the edge 59 of the covered portion 58 of the cushion 53. According to an exemplary embodiment, the linear seams 57 are configured to extend from a first end located approximately in the upper portion of the cushion and mid-width (i.e., about centrally located in the fore-aft direction) of the cushion to a second end located approximately in the central portion of the cushion (relative to height) and forward of the mid-width of the cushion. According to an exemplary embodiment, the first end of the seam 57 is located at the peripheral seam 55 located along the top of the cushion. According to another exemplary embodiment, the first end of the seam 57 is located in the interior portion of the cushion enclosed by the peripheral seam 55.

According to an exemplary embodiment, the three substantially linear seams 57 are configured substantially parallel and offset from each adjacent tear mechanism by an offset distance O. The first seam 57 is configured to begin at the second end located on the interior portion of the airbag cushion at a substantially horizontal distance D1 and substantially vertical distance D2 from the inflator 51 (not shown in FIG. 5) or inflator coupling mechanism 56. The seam 57 is configured to extend from the beginning location at an angle A relative to horizontal to the first end. According to the exemplary embodiment, each seam 57 may be configured to be a lock-stitch made from a thread size of T-70 and may be stitched using seven stitches per inch.

According to the exemplary embodiment, the connection of the airbag cushion 53 includes three substantially linear and parallel seams 57 configured to extend in length about 275 mm across the cushion thorax protection portion. According to this embodiment, the offset distance O between the seams 57 of the connection is about 20 mm, the distance D1 is about 210 mm, the distance D2 is about 30 mm and the angle A is about 70° (degrees).

According to other exemplary embodiments, the offset distance O between any two seams may be any suitable distance. Further, the offset distance O between any two seams may be similar or different than the offset distance O between any other different set of two seams on the same cushion. For example, an airbag cushion may include a connection having three seams, whereby an offset distance O between the first and second seams is 2 mm and whereby an offset distance O' between the second and third seams is 200 mm. Similarly, according to other exemplary embodiments, the distance D and the angle A may vary and be any suitable distance and angle. According to other exemplary embodiments, each seam may be configured non-parallel or uniquely, relative to adjacent seams, whereby each seam of the connection may have a different distance D and angle A, and whereby the offset distance O between any two respective points of the seams may vary (i.e., the offset distance may vary along the lengths of the seams).

According to the exemplary embodiment shown in FIG. 6, the airbag cushion 253 includes one substantially linear tear mechanism 257 configured to extend through the upper portion 254A of cushion 253, whereby the tear mechanism 257 is provided forward of the edge 259 of the covered portion 258 of the cushion 253. Tear mechanism 257 is configured as a lock-stitch made from a thread size of T-90 and stitched using a rate of ten stitches per inch. The tear mechanism 257 is configured to begin at a location on the airbag cushion at a horizontal distance D1 that is about 200 mm and a vertical distance D2 that is about 0 (zero) mm from the lower inflator coupling mechanism 256, and configured to extend at an angle A that is about 60° (degrees) relative to horizontal to a location approximately in the center portion of the seam 255 located along the top of the cushion 253.

With reference to FIG. 7, another exemplary embodiment of a side-impact airbag cushion 353 is shown prior to folding and installation into an airbag system or vehicle and includes an inner panel coupled to an outer panel to form an inflatable chamber having an upper portion 354A and a lower portion 354B. The airbag cushion 353 further includes a connection having three seams 357 and two inflator coupling mechanisms 356, which are configured for attaching the inflator. Each seam 357 of the connection is configured to couple the inner panel of the airbag cushion to the outer panel of the airbag cushion along the length of the seam to prevent or reduce the flow of inflation gas from passing prior to release of the seam 357. Each seam 357 is configured as a lock-stitch made from a thread size of T-50 and stitched using 5 threads per inch.

Each seam 357 of the connection is configured as a semi-circular arc having a radius R from an origin approximately concentric with the upper inflator coupling mechanism 356. The arc formed by the seam 357 begins near a location of the cushion 353 that is forward of the central portion in the fore-aft direction and central in the height direction, and ends near the upper portion of the peripheral seam 355 of the cushion 353. The arc formed by seam 357 first extends from the beginning position in a direction towards the leading edge (i.e., front edge) of the cushion during deployment, and then extends away from the leading edge of the cushion during deployment towards the end position of the seam 357. The seam 357 is provided forward of the edge 359 of the covered portion 358 of cushion 353. According to other exemplary embodiments of airbag cushions having seams forming an arc or semi-circular shape, the seams may be configured to have any suitable arc length, any suitable radius having an origin that may be offset a horizontal distance and/or vertical distance from the upper inflator coupling mechanism or other airbag feature.

According to other exemplary embodiments, an airbag cushion may include a connection or tear mechanism having any number of seams, but should include at least one seam. A connection or tear mechanism that includes more than one seam may be configured having the seams substantially similarly configured, having each seam configured uniquely and different from the other seams, or having a combination of similarly configured and uniquely configured seams. The seams of the tear mechanisms may be configured to be linear, semi-circular, circular, rectangular, or to take the form of any useful or desired shape.

According to an exemplary embodiment, the seams of the tear mechanism may be configured to be substantially parallel or uniformly offset at a distance, relative to the other seams. According to other exemplary embodiments, the seams of the tear mechanism may be configured to extend to form shapes uniquely positioned relative to the other seams, where the seams are not parallel or uniformly offset to the other seams. Additionally, seams configured substantially parallel or uniformly offset may be offset at any distance (e.g., 5 mm, 50 mm, 100 mm) to the other parallel seams, and an airbag cushion having a connection with more than two seams may have the seams configured at varying offset distances. For example, an airbag cushion may include a connection or tear mechanism having three seams configured substantially parallel, where the second seam is uniformly offset by 50 mm from the first seam and where the third seam is uniformly offset by 80 mm from the second seam.

According to other embodiments, the seams of the tear mechanisms or connections may be configured to be any stitch (e.g., chain-stitch) made from any thread size (e.g., T-30, T-45, T-90) having any number of threads per inch (e.g., 3 thread per inch, 10 threads per inch), and may be tailored to specific performance requirements of airbag cushions for use in specific vehicles. Connections or tear mechanisms may be configured to extend any length (e.g., 25 mm, 500 mm) and will vary depending on the airbag system and vehicle. For example, a side-impact airbag cushion is typically configured to have a much smaller inflation volume relative to a front-impact airbag cushion, therefore the tear mechanisms may have a tailored length to meet each airbag and vehicle configuration. According to other embodiments, tear mechanisms may be configured on any portion of any airbag, and may run horizontal, vertical or at any angle, tear mechanisms may be configured to begin anywhere on the airbag cushion (e.g., peripheral seam, interior of the cushion, transition between the peripheral seam and the interior of the cushion), and tear mechanisms may be configured to end anywhere on the airbag cushion (e.g., peripheral seam, interior of the cushion, transition between the peripheral seam and the interior of the cushion).

Those skilled in the art will recognize that the configuration of the connections and/or tear mechanisms and the location of the connections and/or tear mechanisms on the airbag cushion may be tailored to meet specific customer vehicle requirements, and may vary from that disclosed herein. An airbag cushion having a connection and/or tear mechanism is not limited to the configuration shown in FIGS. 5 thru 7, which merely illustrate exemplary configurations developed to meet the requirements of specific vehicles.

Figure 10:
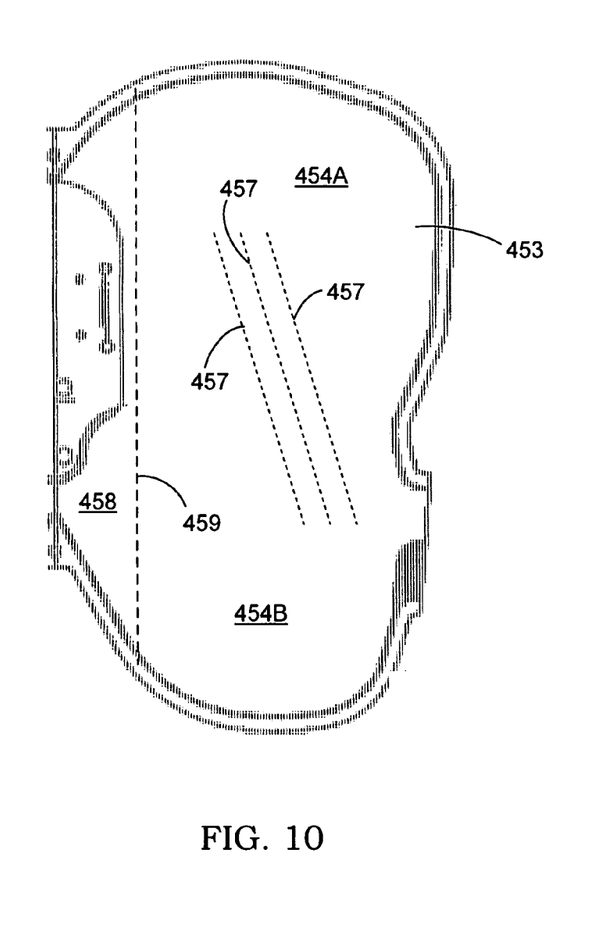
FIG. 10 is a side view of another exemplary embodiment of a side-impact airbag cushion, which includes a tear mechanism, shown prior to folding and installation into a vehicle.
Figure 11:
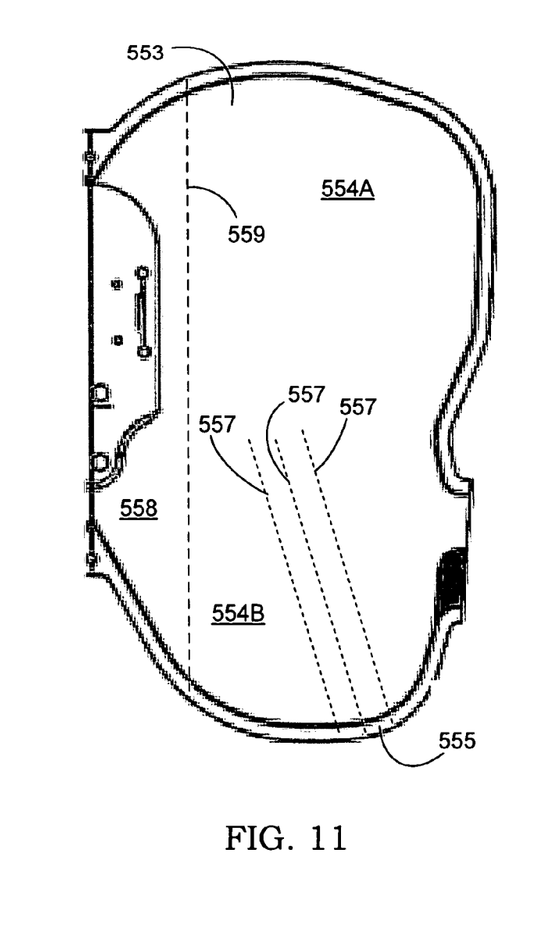
FIG. 11 is a side view of yet another exemplary embodiment of a side-impact airbag cushion, which includes a tear mechanism, shown prior to folding and installation into a vehicle.

An airbag cushion may have tear mechanisms and/or connections located on any region or portion of the cushion. For example, as shown in FIG. 10, an airbag cushion 453 includes a connection having three seams 457 provided forward of the edge 459 of the covered portion 458 of the cushion 453. The seams 457 extend from the upper portion 454A of cushion 453 through the central region of the cushion to the lower portion 454B of the cushion 453. Also for example, as shown in FIG. 11, an airbag cushion 553 includes a tear mechanism having three seams 557 provided forward of the edge 559 of the covered portion 558 of the cushion 553. The seams 557 extend from the central portion of the inflatable chamber of cushion 553 (i.e., between the upper portion 554A and the lower portion 554B of the cushion) through the lower portion 554B of the cushion 553 to a portion of the lower seam 555, which is provided below the lower portion 554B.

Figure 8:
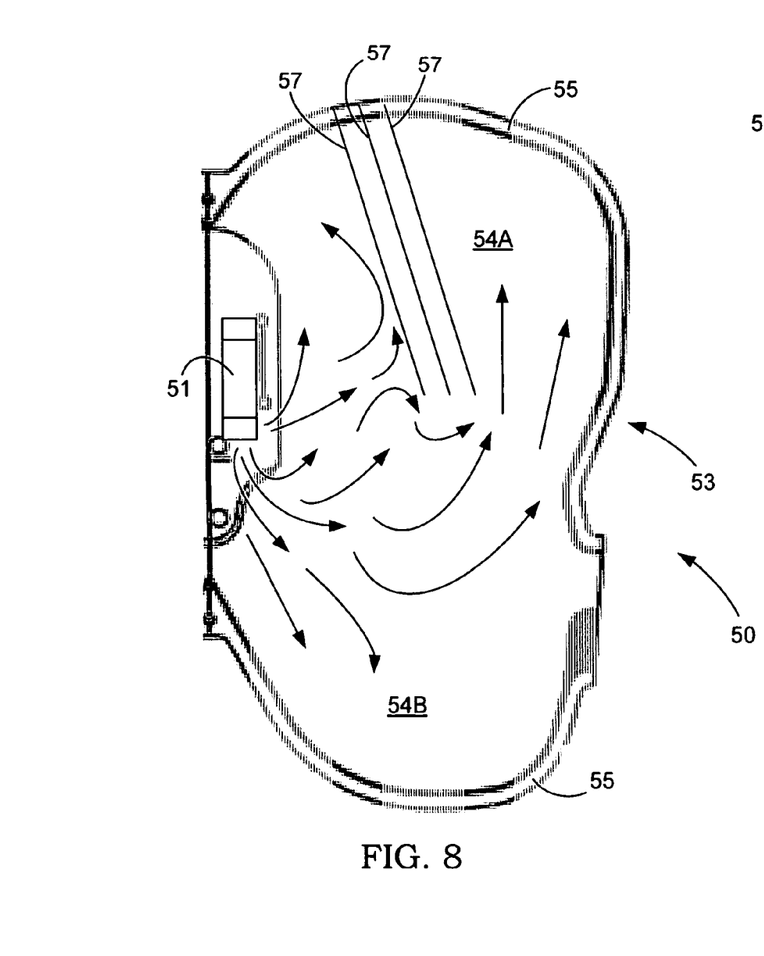
FIG. 8 is a side view of the side-impact airbag cushion of FIG. 5 illustrating the flow of inflation gas in the cushion during airbag deployment and prior to tearing of the tear mechanisms.

With reference to FIG. 8, an exemplary embodiment of the airbag system 50 is shown to illustrate the flow of the inflation gas within airbag cushion 53 having seams 57 of the connection, during airbag deployment, but prior to release of the connection. During a dynamic vehicle event (e.g., collision with another object) that triggers airbag deployment, vehicle sensors trigger activation of one or more than one inflator. An inflator when triggered, generates gas almost instantaneously and pushes the gas at a high volumetric flow rate into the inflatable airbag cushion of the airbag system which it is configured within. During the early stages of deployment, the inflation gas increases the internal pressure of the airbag cushion causing the airbag cushion to unfold and breach the component (e.g., seat-back, dashboard, steering column) that the airbag cushion is folded and stored within.

According to an exemplary embodiment, prior to the airbag cushion 53 breaching the storage component, the seams 57 of the connection are not under load (i.e., tension), due to the volume of the airbag cushion 53 being restricted by the volume of the storage compartment. Once free of the storage compartment (or component), the unrestricted portions of the airbag cushion 53 will continue to expand and unfold from the increasing internal pressure caused by more inflation gas being pushed into the cushion by the inflator. The seams 57 of the connection may be configured to provide a barrier to prohibit or substantially reduce the flow of inflation gas across or through the seam 57, until the tension in the seam 57, induced by expansion of the airbag cushion 53 during deployment, reaches a predetermined force, which causes the seam 57 to release or tear. The release of the connection decouples the inner and outer panels of the airbag cushion 53 allowing inflation gas to pass unabated into the portion of the inflatable chamber that the connection prohibited or reduced inflation gas from entering prior to release.

The seams 57 of the connection, until release, act as a barrier, forcing inflation gas to be redirected away from or along the length of the seams 57. According to the exemplary embodiment shown in FIG. 8, the seams 57 prohibit or reduce the flow of inflation gas into the upper-forward portion of the thorax protection portion 54A of the airbag cushion 53 from the time of initial airbag deployment up to the release of the seams 57. The seams 57 of the connection tailor the inflation sequence of the cushion 53 by delaying inflation of the upper-forward portion of the thorax protection portion 54A and increasing the speed (or decreasing the time) of inflation of the lower portion or pelvic protection portion 54B of the cushion 53. This configuration of cushion 53 having the connection reduces the inertia of the upper-forward thorax protection portion 54A of the airbag during deployment, hence lowering the impact force imparted from the airbag onto an occupant, such as an out-of-position occupant, at contact. This configuration of cushion 53 having the connection may also improve restraint of the occupant by inflating the lower portion 54B more quickly, which allows the airbag cushion 53 to provide earlier restraint to the pelvic region of the occupant.

Figure 9:
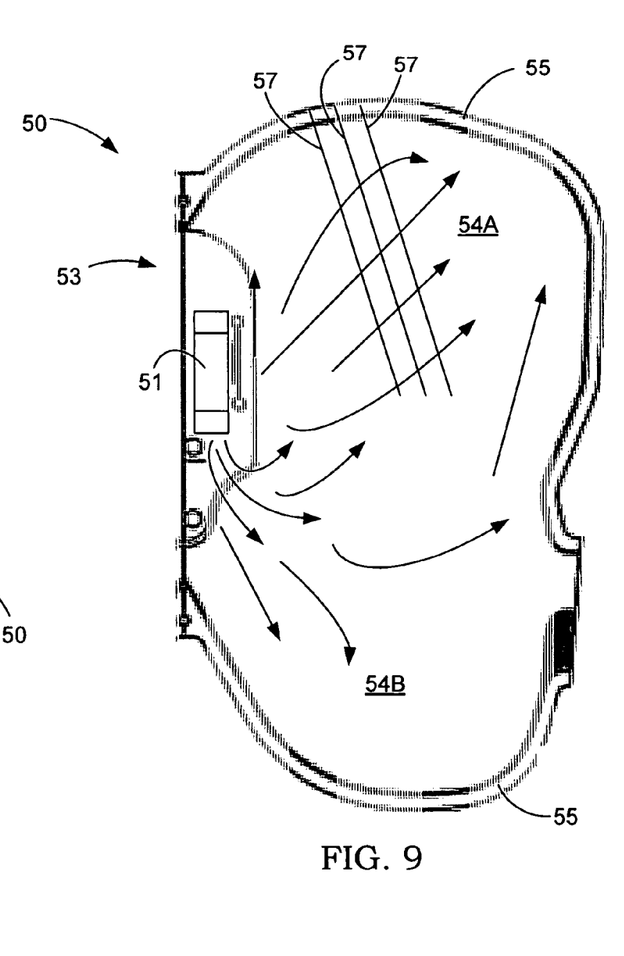
FIG. 9 is a side view of the side-impact airbag system of FIG. 8 illustrating the flow of inflation gas in the cushion during airbag deployment and subsequent to tearing of the tear mechanisms.

With reference to FIG. 9, an exemplary embodiment of the airbag system 50 is shown to illustrate the flow of the inflation gas during airbag deployment subsequent to tearing of the seams 57 of the connection of airbag cushion 53. The seams 57 of the connection may be configured to release during airbag deployment at a predetermined force caused when the internal cushion pressure reaches a predetermined pressure created by inflation gas acting to separate the connection between the inner and outer panels of the cushion 53. The seams 57 of the connection are configured to release to decouple the inner and outer panels of the airbag cushion 53 to allow further expansion and deployment of the airbag cushion 53, by allowing inflation gas to enter the region or portion of the cushion 53 that the connection was prohibiting (or reducing the amount of) inflation gas from entering.

According to the exemplary embodiment shown in FIG. 9, the three seams 57 of the connection may tear sequentially to allow the inflation gas to pass through the area where the connection prohibited or reduced inflation gas flow, which allows the inflation gas to fill and expand the upper-forward portion of the thorax protection portion 54A. For example, the release of the connection allows inflation gas to enter the forward portion of the thorax protection portion 54A after a predetermined amount of inflation of the pelvic protection portion 54B and the rearward portion of the thorax protection portion 54B. According to other embodiments, the seams 57 of the connection may be configured to tear substantially simultaneously to allow inflation gas to pass to inflate any portion of any airbag cushion. The peel force or inflation pressure at which the connection releases may be tailored by altering the properties that influence the strength of the connection, such as the thread size and type, the stitch type, and/or the number of threads per inch.

According to other embodiments, tear mechanisms and connections may be configured to tailor the inflation sequence of any airbag by delaying inflation of any portion of the cushion to reduce the impact or "punch" force caused by any portion of the deploying airbag cushion to provide improved occupant protection or restraint to both in-position and out-of-position occupants. According to other embodiments, an airbag cushion may include more than one tear mechanism or connection to tailor the inflation sequence of the cushion by delaying the inflation of more than one portion of the airbag cushion, to reduce the impact forces from multiple portions of the cushion during deployment.

The airbag cushions having connections, seams, and/or tear mechanisms provided forward, away from, or outside of the covered portion of the airbag cushion are configured to have a delayed release (or delayed tearing) of the connection, seam, and/or tear mechanism, whereby the delay is long enough to provide restraint to an out-of-position occupant without the high impact force from a fully (or substantially fully) inflated airbag cushion. Connections, seams, and/or tear mechanisms configured in the covered portion may release (or tear) too quickly due to the high tension forces induced from the high initial pressure in the covered portion generated by the inflation gas that aids the deploying cushion to breach the seat system in order to deploy to a location to provide restraint to the occupant.

The tear mechanisms and connections may be configured to not alter the final shape and volume of the fully deployed airbag cushion, so that the fully deployed airbag cushion has little or no reduction in internal cushion pressure, thus providing equivalent occupant protection or restraint to in-position occupants relative to airbag cushions without tear mechanisms. Thus, the airbag cushion having at least one tear mechanism or connection may be configured to have a tailored inflation sequence during deployment to provide improved protection or restraint to out-of-position occupants, while providing equivalent protection or restraint to in-position occupants.

Those skilled in the art will recognize that an airbag cushion having a tear mechanism or connection can have the deployment of the airbag further tailored by changing the fold pattern and configuration during folding and installation of the airbag. Additionally, the use of at least one tear mechanism or connection may allow the inclusion of a high mass flow onset inflator within the airbag system, where conventional airbag systems would not employ the use of such inflator due to the high impact or "punch" force induced from the inertia of a sudden deployment. Thus, the inclusion of a tear mechanism or connection within an airbag cushion allows the system to incorporate a high mass flow onset inflator and still have a reduced impact force during deployment.

Figure 14:
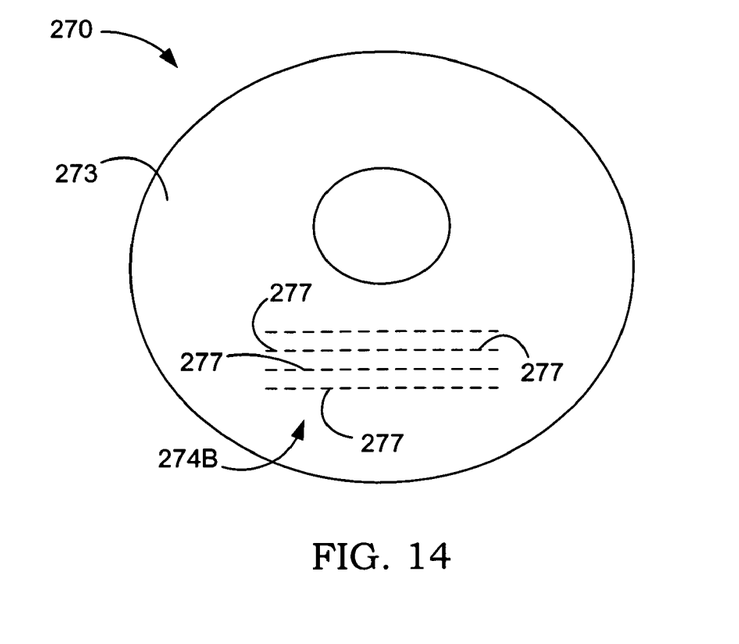
FIG. 14 is a rear view of an exemplary embodiment of a driver front-impact airbag cushion, which includes a tear mechanism, shown deployed.
Figure 15:
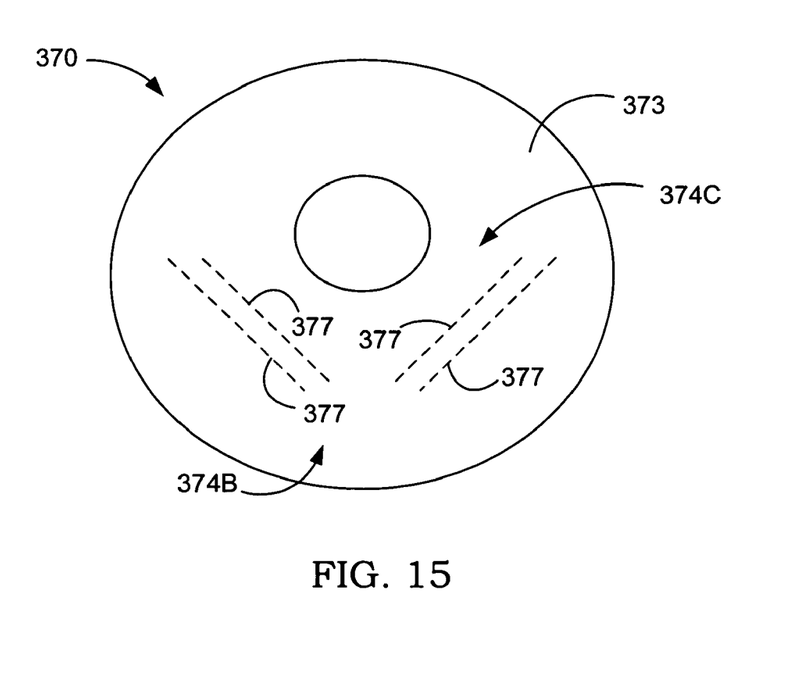
FIG. 15 is a rear view of another exemplary embodiment of a driver front-impact airbag cushion, which includes a tear mechanism, shown deployed.

Those skilled in the art will recognize that the tear mechanisms and connections disclosed herein may be configured on any airbag (e.g., front-impact, side-impact, side-curtain, etc.) and are not limited to being configured for use on side-impact airbag cushions. For example, tear mechanisms and connections may be configured on passenger airbags (PABs), such as those shown in FIGS. 12 and 13, or on driver airbags (DABs), such as shown in FIGS. 14 and 15.

Figure 12:
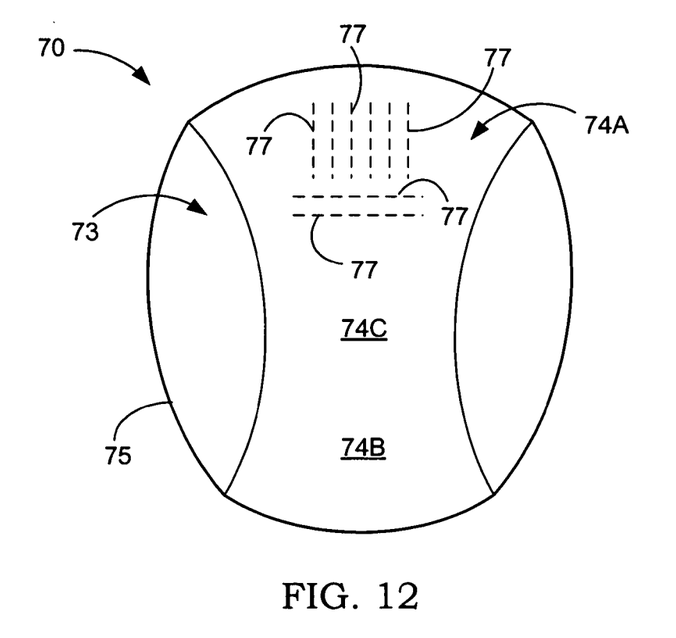
FIG. 12 is a rear view of an exemplary embodiment of a passenger front-impact airbag cushion, which includes a tear mechanism, shown deployed.

With reference to FIG. 12, an exemplary embodiment of a front-impact PAB 70 is illustrated deployed to provide restraint to an occupant (not shown). The PAB 70 may be configured to be stored in and to deploy from the dashboard 27 of the vehicle (as shown in FIG. 2) or from other vehicle devices, which may be located forward of the occupant that is to be restrained. The PAB 70 includes a inflator (not shown) and an inflatable airbag cushion 73, which is formed by coupling one panel to itself or a plurality of panels together using any suitable method. For example, the plurality of panels may be coupled together forming peripheral seams 75 through the use of stitching. The inflatable airbag cushion 73 may comprise more than one inflatable portion and may form any suitable shape upon deployment. For example, airbag cushion 73 may include an upper portion 74A to provide restraint to the head and neck region of the occupant, a lower portion 74B to provide restraint to the pelvic region and/or the legs of the occupant, and a central portion 74C to provide restraint to the thorax region of the occupant.

The airbag cushion 73 further includes at least one tear mechanism. According to an exemplary embodiment, the airbag cushion 73 includes two tear mechanisms. The first tear mechanism includes six seams 77 that are substantially parallel and extend substantially vertically in length. The first tear mechanism is located near the upper portion 74A of the airbag cushion 73. The second tear mechanism includes two seams 77 that are substantially parallel to each other and substantially perpendicular to the seams of the first tear mechanism. The seams 77 of the second tear mechanism extend substantially horizontal in length and are provided below the first tear mechanism. The seams 77 of the tear mechanisms may be configured in any suitable configuration.

Tear mechanisms and connections may be configured, such as shown in FIG. 12, in the upper-central portion of the leading edge (i.e., the leading edge during deployment, that first makes contact with an occupant) of the passenger front-impact airbag cushion, to reduce the punch force imparted by the airbag cushion on the head and neck of an in-position occupant, to improve occupant protection or restraint. The head and neck of the occupant have a lower mass relative to the torso (or thorax) of an occupant, therefore a lower reaction force is required to decelerate the head and neck relative to the torso during a vehicle impact. Thus, occupant protection or restraint may be improved by an airbag that imparts a lower force into the head and neck relative to the force imparted into the torso of the occupant, during deployment.

Figure 13:
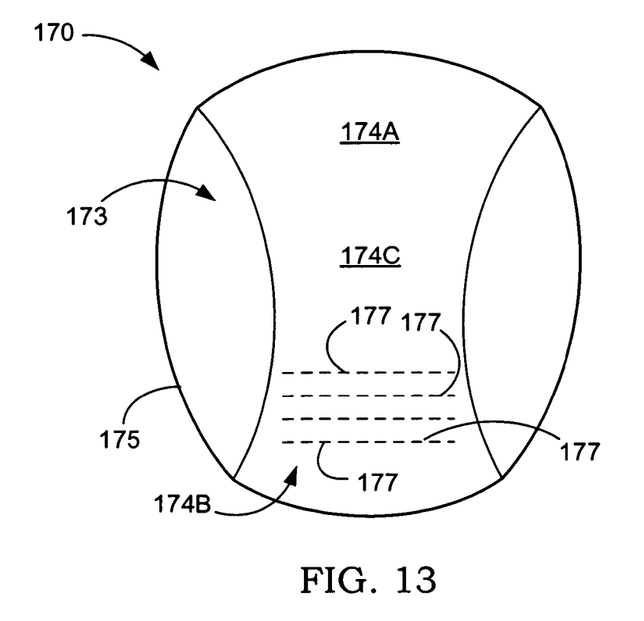
FIG. 13 is a rear view of another exemplary embodiment of a passenger front-impact airbag cushion, which includes a tear mechanism, shown deployed.

With reference to FIG. 13, another exemplary embodiment of a front-impact PAB 170 is illustrated deployed to provide restraint to an occupant (not shown). The PAB 170 includes an inflatable airbag cushion 173 having an upper portion 174A to provide restraint to the head and neck region of the occupant, a lower portion 174B to provide restraint to the legs of the occupant, and a central portion 174C to provide restraint to the thorax and pelvic regions of the occupant. The airbag cushion further includes a tear mechanism having four linear seams 177 provided in the lower portion 174B of the cushion 173, where the seams 177 are configured substantially parallel to each other at an offset distance and extend approximately horizontal.

Tear mechanisms and connections may be configured, such as shown in FIG. 13 to reduce the punch force imparted by the airbag cushion on the legs of an in-position occupant, to improve occupant protection or restraint. The legs of the occupant have a lower mass relative to the pelvic and thorax regions of the occupant, therefore a lower reaction force is required to decelerate the legs relative to the pelvic and thorax of the occupant, during a vehicle impact. Thus, occupant protection or restraint may be improved by an airbag that imparts a lower force into the legs of the occupant relative to the force imparted into the thorax and pelvic regions of the occupant, during deployment.

It should be noted that the tear mechanisms illustrated in FIGS. 12 and 13 may be combined into one exemplary embodiment, whereby the airbag cushion would reduce the punch force imparted into the head, the neck and the legs of the occupant. Thus, the airbag cushion could deploy providing lower reaction forces into the head, neck and legs of the occupant, relative to the thorax and pelvis of the occupant.

With reference to FIGS. 14 and 15, exemplary embodiments of DABs 270, 370 are illustrated deployed to provide restraint to an occupant (not shown). According to an exemplary embodiment, DAB 270 includes an inflatable airbag cushion 273 to provide restraint to the driver and an inflator (not shown) to provide inflation gas to the airbag cushion 273. Airbag cushion 273 may be configured to deploy to any suitable shape, and includes a connection having four seams 277 provided in the lower portion 274B of the cushion 273. The seams 277 are configured in substantially horizontal and are substantially parallel.

According to another exemplary embodiment, DAB 370 includes an inflatable airbag cushion 373 configured to provide occupant restraint. The airbag cushion 373 may be configured to deploy to any suitable shape, and includes two connections, whereby each connection includes two seams 377. The two seams 377 of the first connection are provided on the right side of the cushion 373 extending diagonally from a central location of a lower portion 374B of cushion 373 outwardly to the right side of a central portion 374C of cushion 373. The two seams 377 of the second connection are provided on the left side of cushion 373 extending diagonally from a central location of the lower portion 374B of cushion 373 outwardly to the left side of the central portion 374C of cushion 373.

Those skilled in the art will recognize that the tear mechanisms and connections disclosed herein are not limited to those embodiments illustrated and described herein, and may be modified to be tailored to any specific vehicle requirements. For example, the airbag cushion 73 of PAB 70 shown in FIG. 12 may further include a third tear mechanism, which may be provided at any location on the airbag cushion and may have any shape, any quantity of seams, and have any configuration of seams, such as seams orientated to have an angle relative to horizontal. Another example may include the airbag cushion shown in FIG. 15, and configured to include at least a third connection, where the third connection may be configured to be in the upper portion of the airbag cushion having any suitable configuration in order to reduce the punch force onto the head and neck of the occupant during an airbag deploying event.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the airbags including tear mechanisms as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module comprising:
   an inflatable airbag; and
   an inflator configured to provide gas to inflate the airbag;
   wherein the airbag comprises first and second panels positioned on opposite sides of an inflatable chamber;
   wherein each of the first and second panels include a peripheral portion and an interior portion;
   wherein a portion of each interior portion is a covered portion;
   wherein a portion outside of each covered portion of a respective interior portion of the first and second panels is connected together to thereby limit inflation of a portion of the inflatable chamber;
   wherein the airbag is configured so that the connection between the interior portions is released during inflation of the airbag in order to permit an increase in volume of the inflatable chamber; and
   wherein the connection between the interior portions of the first and second panels includes a plurality of stitched seams that are each configured to extend from a first end in an upper portion of the inflatable chamber that is central to a width of the inflatable chamber and abutting or extending from an upper and outer edge of the airbag to a second end at about a mid-height portion of the inflatable chamber that is forward along the width of the inflatable chamber.

2. The airbag module of claim 1, wherein the a plurality of stitched seams are parallel to one another.

3. The airbag module of claim 2, wherein the plurality of stitched seams are configured to release the interior portions of the first and second panels at different times during inflation of the airbag.

4. The airbag module of claim 1, wherein the plurality of stitched seams are non-linear to one another.

5. The airbag module of claim 1, wherein the connection between the interior portions of the first and second panels is located in the upper portion of the inflatable chamber so that upon initiation of the inflator and prior to release of the connection between the interior portions of the first and second panels inflation of the upper portion of the inflatable chamber is limited while inflation of a lower portion of the inflatable chamber is unabated.

6. The airbag module of claim 5, wherein the connection between the interior portions of the first and second panels that is located in the upper portion of the inflatable chamber extends in length to a central portion of the inflatable chamber.

7. An airbag module comprising:
   an inflatable airbag; and
   an inflator configured to provide gas to inflate the airbag;
   wherein the airbag comprises first and second panels positioned on opposite sides of an inflatable chamber;
   wherein each of the first and second panels include a peripheral portion and an interior portion;
   wherein the interior portions of the first and second panels are stitched together along a plurality of seams to thereby limit the inflation of a portion of the inflatable chamber;
   wherein the plurality of seams do not intersect with the peripheral portions of the first and second panels;
   wherein the seams are configured to tear apart during inflation of the airbag in order to allow the interior portions of the first and second panels to separate and thereby permit further inflation of the portion of the inflatable chamber; and
   wherein each of the plurality of seams is configured to extend from a first end in an upper portion of the inflatable chamber that is central to a width of the inflatable chamber and abutting or extending from an upper and outer edge of the airbag to a second end at about a mid-height portion of the inflatable chamber that is forward along the width of the inflatable chamber.

8. The airbag module of claim 7, wherein the plurality of seams are separated by an offset distance that remains constant along the lengths between any two seams.

9. The airbag module of claim 7, wherein the plurality of seams are separated by an offset distance that varies along the lengths between any two seams.

10. The airbag module of claim 9, wherein the plurality of seams arc non-linearly configured.

11. An airbag module comprising:
   an inflatable airbag;
   an inflator configured to provide gas to inflate the airbag;
   wherein the airbag comprises first and second panels positioned on opposite sides of an inflatable chamber;
   wherein each of the first and second panels include a peripheral portion and an interior portion having a covered portion;
   wherein the airbag includes a tear mechanism including a plurality of stitched seams provided outside of the covered portions connecting the interior portions of the first and second panels together to thereby limit the inflation of a portion of the inflatable chamber;
   wherein the plurality of stitched seams are configured to release the connection between the interior portions of the first and second panels during inflation of the airbag in order to permit further inflation of the portion of the inflatable chamber; and
   wherein each of the plurality of stitched seams is configured to extend from a first end in an upper portion of the inflatable chamber that is central to a width of the inflatable chamber and abutting or extending from an upper and outer edge of the airbag to a second end at about a mid-height portion of the inflatable chamber that is forward along the width of the inflatable chamber.

* * * * *